United States Patent [19]

Schröder et al.

[11] Patent Number: 4,759,674

[45] Date of Patent: Jul. 26, 1988

[54] REMOTELY-OPERABLE POSITIONING AND CARRYING APPARATUS FOR REMOTE-HANDLING EQUIPMENT

[75] Inventors: Günter Schröder, Minden; Günther Dudek, Visselhövede; Rudolf Eichhorn; Jürgen Forster, both of Minden, all of Fed. Rep. of Germany

[73] Assignee: Deutsche Gesellschaft für Wiederaufarbeitung von Kernbrennstoffen mbH, Hanover, Fed. Rep. of Germany

[21] Appl. No.: 853,001

[22] Filed: Apr. 17, 1986

[30] Foreign Application Priority Data

Apr. 18, 1985 [DE] Fed. Rep. of Germany ....... 3513999

[51] Int. Cl.$^4$ .................................................. G21C 19/00
[52] U.S. Cl. ..................................... 414/146; 376/260; 294/67.21; 294/67.5; 294/82.12; 294/81.3; 414/626; 414/680; 414/744 R; 414/719; 901/48; 901/1; 901/23; 248/325; 248/280.1; 248/123.1
[58] Field of Search ............... 414/146, 626, 680, 719, 414/743, 729, 732, 738, 744 R, 744 A, 744 B, 744 C, 909; 376/268, 260, 264; 901/48, 1, 19, 23, 24; 294/67.21, 82.12, 67.5, 81.3; 248/325, 280.1, 123.1

[56] References Cited

U.S. PATENT DOCUMENTS

| | | | |
|---|---|---|---|
| 3,051,328 | 8/1962 | Brown et al. | 414/730 X |
| 3,104,016 | 9/1963 | Harry | 414/626 X |
| 3,227,290 | 1/1966 | Lemelson | 414/729 X |
| 3,421,635 | 1/1969 | Bunger | 414/146 X |
| 3,451,224 | 6/1969 | Colechia et al. | 414/738 X |
| 3,741,409 | 6/1973 | Painter | 901/48 X |
| 4,017,109 | 4/1977 | Belinsky | 294/67.21 |
| 4,592,258 | 6/1986 | Halm | 408/234 X |
| 4,664,873 | 5/1987 | Hendrich et al. | 414/8 X |

FOREIGN PATENT DOCUMENTS

| | | | |
|---|---|---|---|
| 1746189 | 6/1957 | Fed. Rep. of Germany | . |
| 2452345 | 5/1976 | Fed. Rep. of Germany | 414/732 |
| 138996 | 8/1984 | Japan | 414/146 |
| 632635 | 11/1978 | U.S.S.R. | 294/67.21 |

OTHER PUBLICATIONS

Publication "Atomwirtschaft"-pp. 434-438.

*Primary Examiner*—Frank E. Werner
*Attorney, Agent, or Firm*—Walter Ottesen

[57] ABSTRACT

The invention is directed to a remotely-operable positioning and carrier apparatus for remote-handling equipment for use in large-area cells containing process components. The apparatus is mounted on a lifting device of an overhead bridge crane. The apparatus achieves good positioning of the particular remote-handling equipment even at locations which are poorly accessible. The apparatus includes a horizontal beam which is fixed at an eccentric position thereon to the bottom sheave unit of the lifting device so that the horizontal beam defines a long lever arm and a short lever arm. A receiving lever is pivotally connected to the end of the longer lever arm. The receiving lever has an equipment receiving device at its free end. A displaceable counterweight is arranged on the short lever arm for altering the position of the center of gravity of the apparatus. This apparatus makes it possible also to operate in spaces beneath components present in a rack. It is further possible for vertical forces to be applied to objects on one side in parallel relationship to the line of action of the lift cable of the lifting device. With the apparatus of the invention, it is possible to operate with a crane in areas inaccessible with the hook of the crane lifting device.

15 Claims, 4 Drawing Sheets

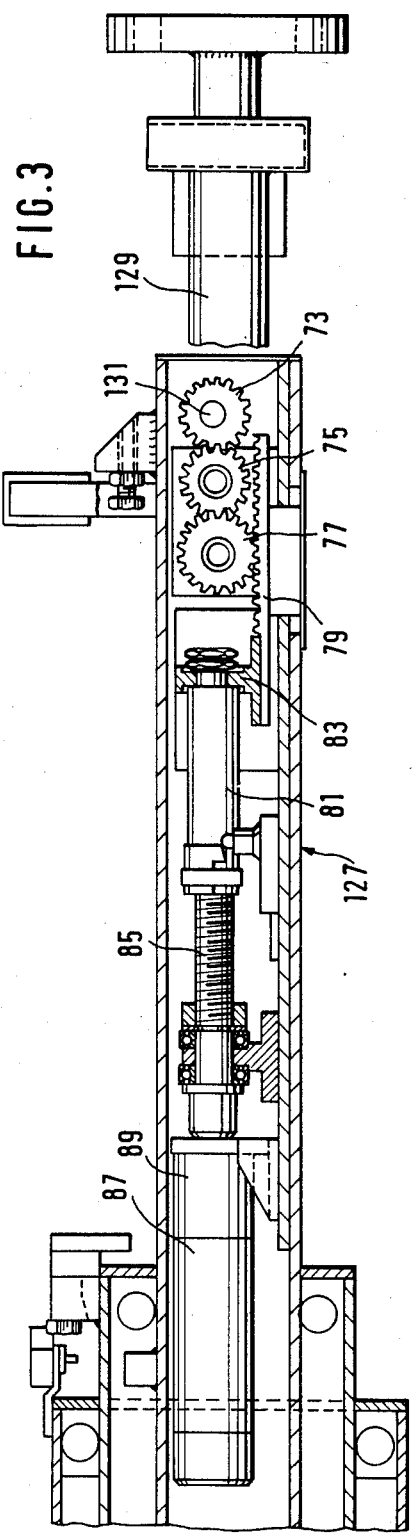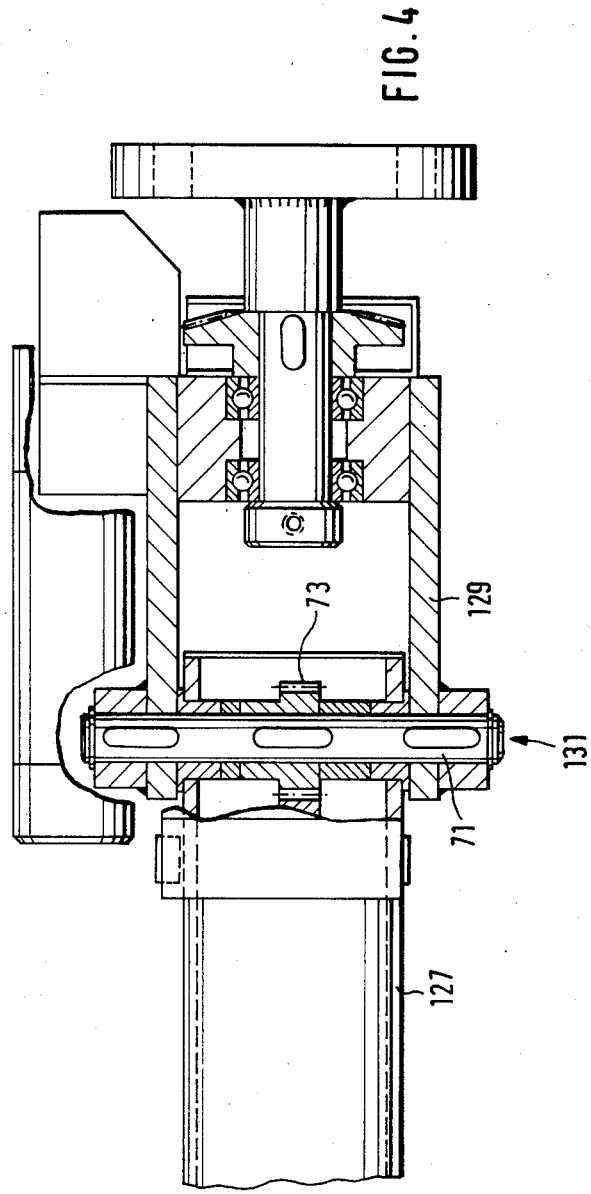

REMOTELY-OPERABLE POSITIONING AND CARRYING APPARATUS FOR REMOTE-HANDLING EQUIPMENT

FIELD OF THE INVENTION

The invention relates to a remotely-operable positioning and carrying apparatus for remote-handling equipment for use in a large-area cell containing process components such as in the radioactively charged large-area cell of a facility for reprocessing irradiated nuclear fuels. The apparatus is mounted to the lifting unit of an overhead bridge crane.

BACKGROUND OF THE INVENTION

Installations for reprocessing irradiated nuclear fuels are provided with what are known as large-area hot cells for receiving the process components. In such radiation-shielded cells, the process components are set up in frames or structures which are known as racks. The racks are arranged at the longitudinal sides of the cell with a transportation and handling passageway therebetween.

For the purposes of carrying out maintenance and repair operations on the process components, it has been suggested that the operations can be performed by means of movable remote-handling machines. One proposal in regard to a remote-handling system provides that a remotely-controlled travelling bridge crane operates above the racks and beneath the top wall of the cell. The crane passes over the racks and has a cable or chain lifting unit which operates vertically. Disposed beneath the travelling bridge crane is a second movable bridge carrier which has a vertical mast which is movable on a trolley. Disposed on the mast is a vertically movable chassis frame structure with an extendable arm which has a tool carrier plate for carrying or connecting the tools or handling apparatus. With this arrangement, it is possible to install a manipulator system affording the possibility of horizontal access to the process equipment from the handling passageway. In this connection, reference may be made to the journal "Atomwirtschaft", August/September 1984, pages 436 to 438, and U.S. Pat. No. 4,664,873.

A further proposal regarding the configuration of suitable remote-handling machines or carrier and positioning apparatus for remote-handling equipment or tools provides that the individual implements or machine tools are disposed in special carrier arrangements which are suitable for being picked up by a crane hook. The remote-handling implement which is suspended by its pick-up means from the crane hook is moved to the location of use thereof by means of the remote-control means of the travelling bridge crane as disclosed in U.S. Pat. No. 4,592,258.

The maintenance system with crane hook and carrier apparatus represents a lower level of complexity than the bridge carrier arrangement with the vertical guide mast which carries the manipulator systems. With the remote-handling concept consisting of the "crane hook and special receiving apparatus" it is not possible to carry out operations within the racks on such components that are located beneath other process components in the rack and that lie back from the front end of the rack. Stated otherwise, it is not possible with a cable or chain lifting unit which is positioned above the rack and which operates vertically to reach components which are beneath existing components in the rack.

The result of using the remote-handling concept consisting of the "travelling bridge crane and carrier apparatus" was that spaces were left free beneath components already present in the particular rack, and the components which were to be lifted or replaced were arranged on the outside surface of the rack in the form of a pyramid.

SUMMARY OF THE INVENTION

It is an object of the invention to provide a remotely-operable positioning and carrier apparatus which utilizes the existing travelling bridge crane as the transportation means and permits the particular remote-handling equipment to be satisfactorily positioned to the location at which operations are to be performed. It is a further object of the invention to provide such an apparatus which can also be used at locations which are difficult to reach such as within the rack structure and between the process components already mounted in the rack.

The remotely-operable positioning and carrying apparatus according to the invention is for remote handling and remotely-controlled devices used in large-area cells containing process components such as radioactively-charged large-area cells of facilities for reprocessing irradiated nuclear fuel. The large-area cell is equipped with an overhead bridge crane or the like which is provided with a lifting device having a lower sheave unit. The apparatus of the invention includes: a horizontal beam having a center location along the length thereof and which is connected to the lower sheave unit so as to be rotatable in a horizontal plane. The horizontal beam is connected to the lower sheave unit at a connecting location spaced away from said center location thereby defining a short lever arm and a long lever arm. A receiving lever is pivotally connected to the end of the long lever arm and has an outer free end. A receiving device is adapted for receiving equipment and is mounted on the outer free end of the receiving lever and counterweight means is mounted on the short lever arm for varying the location of the center of gravity of the apparatus.

The longer lever arm of the beam-like apparatus is used as the operating arm which can extend far into the rack structure.

The beam-like apparatus whose center of gravity does not lie at the center of the length of the horizontal beam of this apparatus allows a substantial horizontal reach into the rack structure. This reach extends beneath process components which are already to be found in the rack. The apparatus has a shorter compensating-weight arm. A displaceable counterweight is provided on this arm for the purpose of varying the position of the center of gravity of the apparatus. The apparatus is mounted to the bottom sheave unit of the crane. The sheave unit is rotatably driven by a motor, so that the longer operating arm can also project into the rack structure at an angle with respect to the transportation passageway. Because of the pivotable configuration of the receiving lever, the particular remote-handling equipment, for example an impact wrench mounted on the end of the lever, can be moved into various operating positions from the horizontal to the vertical.

The invention also makes it possible for perpendicular forces to be applied to objects on one side of the line of action of the cable extending to the lower sheave unit and parallel thereto. The torque which is produced as a result of this mode of operation at the crane sheave unit is counteracted within the handling system by the counterweight to thereby hold the apparatus approximately in a horizontal position.

When the particular remote-handling implement is in a position which changes the position of the center of gravity of the system, the counterweight is moved so that the apparatus is always held in a desired position which is as far as possible horizontal or a desired position which deviates therefrom.

According to another feature of the invention, the longer lever arm is configured so as to be telescopically extendable. This affords the advantage that, after the positioning apparatus has been transported to a position in front of the rack in which the position at which work is to be performed is located, the longer lever arm which extends into the rack provides for a precise approach movement to the position of work under remote control by means of the telescopic arrangement. Fine positioning no longer needs to be dealt with by means of the travelling bridge crane. Swinging movements of the system are eliminated.

In another advantageous embodiment according to the invention, the implement receiving device is arranged in the receiving lever so as to be rotatable by motor means. The pivotable receiving lever with the equipment receiving device which can be driven by motor means, provides important degrees of freedom for the carrier and positioning apparatus to be used as a handling apparatus. The equipment receiving device is preferably rotatable through 360°.

The counterweight means includes guide surface means formed on the short lever arm of the horizontal beam and a counterweight slideably mounted on the guide surface means. A threaded spindle threadably engages the counterweight and a spindle drive motor drives the spindle for displacing the counterweight along the short lever arm. Thus, the counterweight can be moved under remote control on the shorter lever arm into the desired position for determining the center of gravity of the apparatus by means of the spindle drive.

The lower sheave unit can have a rotatable flange and the horizontal beam can be provided with a horizontal attachment flange at the above-mentioned connecting location for attaching the apparatus to the rotatable flange.

The above configuration permits the apparatus according to the invention to be easily mounted to a rotatable flange of the bottom sheave unit of the bridge crane. Fixing may be effected by means of a known threaded-fastener flange connection or by means of a positive-locking arrangement.

The receiving lever is pivotally connected to the long lever arm for pivotal movement between an upper position and a lower position. The apparatus includes actuating means for pivotally moving the receiving lever between these positions.

With this embodiment according to the invention, the pivotal movement of the receiving lever is produced by a relative movement of two components. One component is attached at one end thereof to the receiving lever and the other component is attached at one end thereof to the long lever arm.

In a particularly advantageous embodiment, the actuating means is a spindle drive means for producing the pivotal movement of the receiving lever. The spindle drive means comprises: a spindle unit including a first threaded spindle member pivotally connected at one end thereof to the receiving lever; and, a second threaded spindle member threadably engaging the first threaded spindle member. Pivot drive means is mounted on the long lever arm and a cardan joint connects the second threaded spindle member to the pivot drive means. The drive unit of the spindle drive means which produces the pivotal movement is fixedly mounted in a mounting block or unit secured to the long lever arm. One of the threaded spindle members can be a threaded sleeve which is rotatable by means of a cardan joint so that the other one of the threaded spindle members can be in the form of a threaded spindle pivotally mounted on the receiving lever. The threaded spindle is rotated in or out, depending on the direction of rotation. In this way, the receiving lever can be pivoted downwardly out of the horizontal to a 90° position about its pivot joint located at the end of the long lever arm. The return movement of the receiving lever into the horizontal position of the beam may advantageously be restricted by an electrical limit stop. The pivotal movement of the receiving lever between the horizontal 0° and the vertical 90° can be stopped and fixed in any desired intermediate position.

According to still another feature of the invention, the receiving device includes: an extension shaft defining a longitudinal axis; bearing means for rotatably journalling the extension shaft in the outer free end of the receiving lever and for preventing displacement of the extension shaft along said longitudinal axis thereof; and, a connecting flange mounted on the outer end of said extension shaft.

In this embodiment, the receiving device is rotatable about the longitudinal axis of the receiving lever.

In another embodiment of the invention, the receiving lever is pivotally driven by means of a pivot drive which is operatively connected to a gear wheel fixed to the pivot shaft of the rotary joint for connecting the receiving lever to the long lever arm. In this arrangement, it is advantageous for the pivot drive to be mounted in the end of the long operating arm. If the end of the long operating arm is larger than the remainder thereof, the pivot drive which is mounted at this location may be of larger dimensions and can transmit higher torques to the pivot shaft of the rotary joint and thus to the receiving lever.

The apparatus according to the invention permits operating with a crane in areas outside the area of accessibility of the hook of the crane. Accordingly, it is possible to operate within the rack module beneath components which are disposed therein and on parts which are disposed at such locations.

In comparison with the arrangement for a holding apparatus for an impact wrench disclosed in U.S. patent application Ser. No. 580,514, filed on Feb. 15, 1984, which arrangement permits a change from a horizontal to a vertical operating position, the positioning and carrier apparatus according to the invention affords the advantage of a greater radius of action when operating in the interior of racks which are fitted with process components.

BRIEF DESCRIPTION OF THE DRAWING

The invention will now be described in greater detail with reference to the drawing wherein:

FIG. 3 is an elevation view, in section, of a modified embodiment of the pivot drive means for the receiving lever for carrying the equipment receiving device;

FIG. 4 is a plan view, in section, of a portion of the configuration shown in FIG. 3.

DESCRIPTION OF THE PREFERRED EMBODIMENTS OF THE INVENTION

Figure 1:
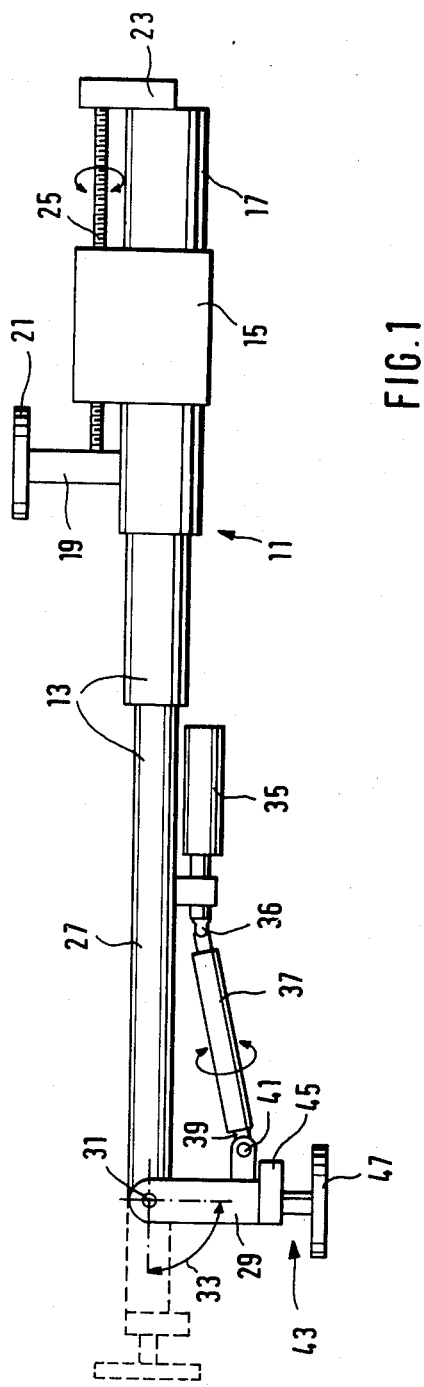
FIG. 1 is a side elevation view of a positioning and carrier apparatus according to the invention and is shown equipped with the receiving lever mounted on a telescopic operating arm.

The apparatus illustrated in FIG. 1 has a horizontal beam 11 which comprises a telescopically extendable operating arm 13 and a compensating arm 17 which carries a displaceable counterweight 15. Provided on the horizontal beam 11, by means of a spacer member 19, is a horizontal attachment flange 21 for attaching the apparatus to a lower crane sheave unit (not shown) rotatably driven by a motor. The counterweight 15 on the compensating arm 17 is movable thereon by means of an electromechanical displacement device 23. For this purpose, the device 23 includes spindle drive means 25 which has long been known.

The free end of the last telescopic length 27 of the operating arm 13 is connected to a receiving lever 29 by means of a pivot joint 31. The receiving lever 29 is pivotable downwardly into a perpendicular position from the horizontal position (shown in phantom outline in FIG. 1) and back as indicated by the double arrow 33. The pivotal movement of the receiving lever 29 is produced by means of an electric-motor pivot drive 35 which is fixed to the telescopic length 27 and which rotatably drives a sleeve 37 having an internal thread. The sleeve 37 is suspended by means of a cardan joint. A threaded spindle 39 threadably engages the internal thread of sleeve 37. The threaded spindle 39 is connected to the receiving lever 29 by means of a joint 41.

A device 43 for picking up equipment is mounted to the free end of the receiving lever 29. The device 43 can be rotated by means of an electromechanical drive 45. The device 43 has a connecting flange 47 to which the particular operating means or remote-handling implement or other accessory tool can be flange-connected. The remote-handling implement is thus rotatable about the longitudinal axis of the receiving lever 29.

Figure 2:
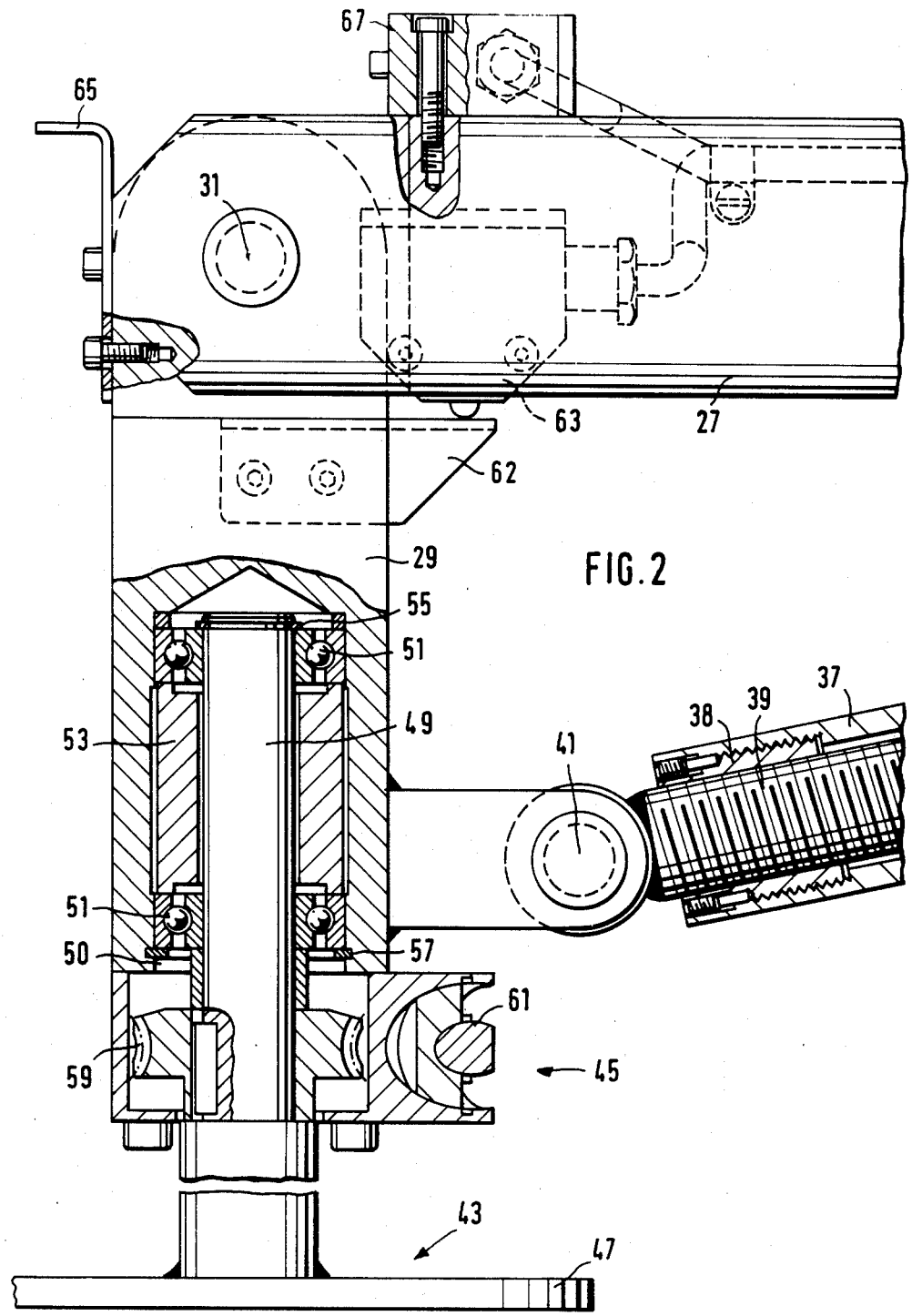
FIG. 2 is a detail view, in section, of part of the apparatus of FIG. 1.
Figure 5:
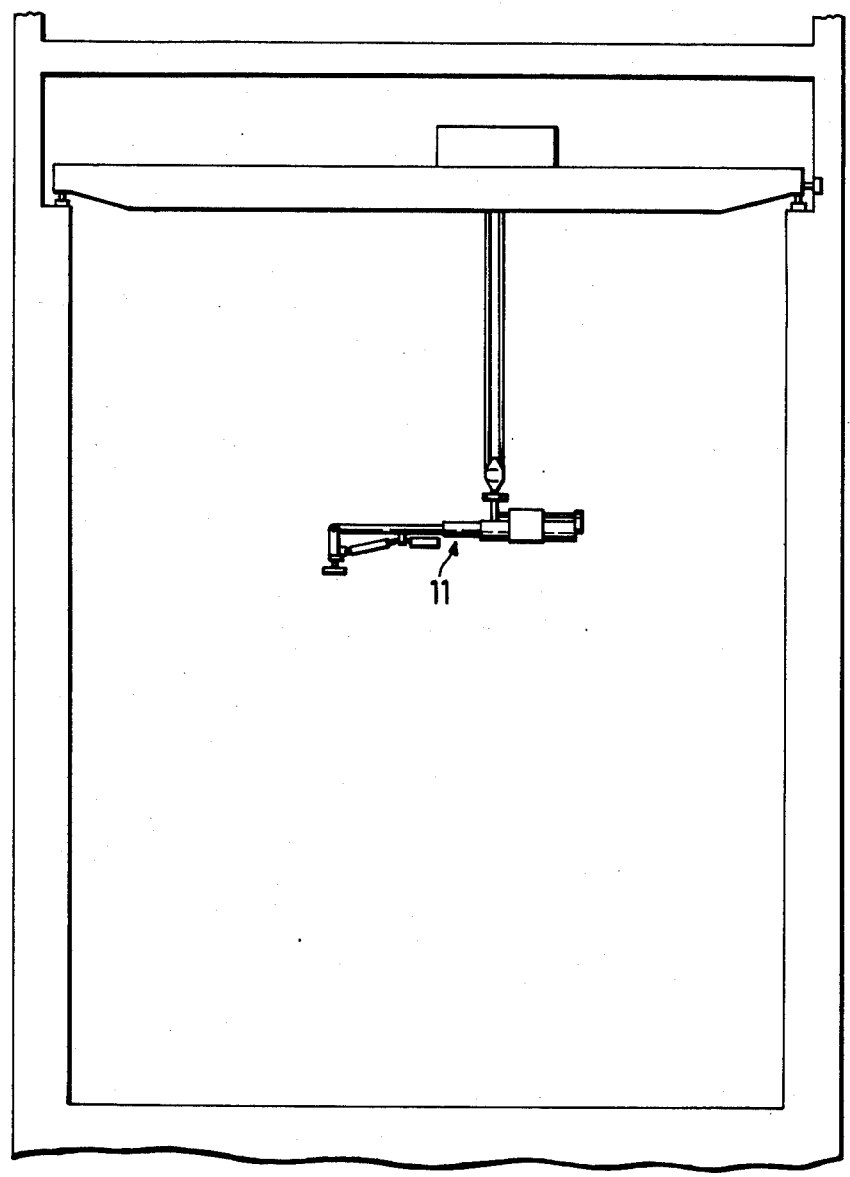
FIG. 5 is an elevation view of a large-area hot cell equipped with an embodiment of the system of the invention.

The connecting flange 47 has an extension shaft 49 (see FIG. 2) which is rotatably journalled in a bore 50 at the end of the receiving lever 29 and is mounted so as to be fixed against axial displacement. For that purpose, use is made of components that have long been known such as roller bearings 51, spacer sleeve 53 and circlips 55 and 57.

The rotary drive 45 includes a worm gear 59 which is connected to the shaft 49 and which can be driven by a worm 61.

An end stop 62 for the vertical position of the receiving lever 29 is fastened to the receiving lever 29. The end stop 62 coacts with an electrical limit switch 63 which is mounted on the telescopic length 27. A further end stop 65 is disposed at 90° with respect to the end stop 62 and is fixed on the surface of the receiving lever 29; in the horizontal position of the receiving lever 29, the further end stop 65 indicates the 0° position by means of a further limit switch 67 on the telescopic length 27.

The mode of operation of the above-described apparatus will now be described.

The apparatus is mounted by means of the fixing flange 21 to the rotatable bottom sheave unit (not shown herein) of the travelling bridge crane. The apparatus is transported to the location of use thereof by means of the bridge crane. After the last telescopic portion 27 of the operating arm 13 has been extended, the apparatus which was moved into a position in front of the rack and which extends into the rack structure can finely position the operating implement relative to the location at which it is to operate. If, for example, vertically disposed threaded fasteners are to be released, the pivotal drive 35 for the receiving lever 29 is actuated and the latter is pivoted into the vertical position by reducing the length of the spindle drive 37, 39. The socket of the impact wrench can now be applied to the threaded fasteners or nuts and can release or fix the same. Preparatory to the foregoing, the counterweight 15 on the compensating arm 17 is moved into such a position as to exert a suitable counteracting moment in order to change the position of the center of gravity of the horizontal beam 11. The beam-like apparatus can thereby be held in the position with respect to the horizontal as required by the operator.

FIGS. 3 and 4 show a modified embodiment of the pivotal drive for the receiving lever 129. The end of the operating arm or the last telescopic length 127 thereof is of a hollow configuration in this arrangement so that the pivotal drive can be disposed substantially within the operating arm.

The rotary joint 131 for the receiving lever 129 has a joint shaft 71 which is fixedly connected to the lever 129 and which passes transversely through the end of the telescopic length 127. In the interior of the telescopic length 127, a gear wheel 73 is fixedly attached to joint shaft 71. The gear wheel 73 meshes with a pair of gear wheels 75 and 77. The outer gear wheel 77 meshes with a linear gear 79 which is connected via a fixing lug 83 to an axially mounted spindle nut 81.

The nut 81 is movable on an axially mounted threaded spindle 85 so that this movement is transmitted by means of the linear gear 79 to the gear drive 73, 75 and 77 and thus as a pivotal movement to the receiving lever 129. The threaded spindle 85 can be driven in rotation by means of a commercially available electric motor 87 with a transmission unit 89 flange-connected thereto.

With this embodiment, the receiving lever 129 can also be pivoted upwardly, the range of pivotal movement of the receiving lever 129 being at least 180°.

It is understood that the foregoing description is that of the preferred embodiments of the invention and that various changes and modifications may be made thereto without departing from the spirit and scope of the invention as defined in the appended claims.

What is claimed is:

1. In a large-area cell of a facility for reprocessing irradiated nuclear fuel, the large-area cell including process components and being equipped with an overhead bridge crane or the like which is provided with a lifting device having a lower sheave unit, and a remotely-operable positioning and carrying apparatus attachable to said sheave unit for holding remote-handling equipment and for positioning the latter for performing work on the process components, the apparatus comprising:

a beam having a center location along the length thereof and being connected to the lower sheave unit so as to be rotatable in a horizontal plane, said beam being connected to said lower sheave unit at a connecting location spaced away from said center location thereby defining a short lever arm and a long lever arm;

said long lever arm defining a longitudinal axis and including a plurality of coaxially and mutually overlapping elongated members movable relative to each other so as to extend the length of said long lever arm along said axis and to permit one of said elongated members to be movable to an outermost distance away from said short lever arm;

means for moving said elongated members along said longitudinal axis;

a receiving lever pivotally connected to the outer end of said one elongated member and having an outer free end, said long lever arm and said receiving lever conjointly defining a common plane;

a receiving device adapted for receiving said remote-handling equipment and mounted on said outer free end of said receiving lever;.

counterweight means slidably mounted on said short lever arm for varying the location of the center of gravity of said apparatus so as to maintain said beam in a desired position thereby permitting the remote-handling equipment to perform work at a predetermined location; and actuating means mounted on said one elongated member for actuating said receiving lever for pivoting the latter with respect to said long lever arm in said common plane.

2. The apparatus of claim 1, said elongated members being configured so as to interengage telescopically.

3. The apparatus of claim 1, said receiving device being rotatably journalled in said outer free end of said receiving lever, said apparatus comprising motor drive means for rotatably driving said receiving device.

4. The apparatus of claim 3, said receiving device including an extension shaft defining a longitudinal axis; bearing means for rotatably journalling said extension shaft in said outer free end of said receiving lever and for preventing displacement of said extension shaft along said longitudinal axis thereof; and, a connecting flange mounted on the outer end of said extension shaft.

5. The apparatus of claim 1, said counterweight means comprising: guide surface means formed on said short lever arm; a counterweight slideably mounted on said guide surface means; a threaded spindle threadably engaging said counterweight; and, spindle drive motor means for driving said spindle for displacing said counterweight along said short lever arm.

6. The apparatus of claim 1, said lower sheave unit having a rotatable flange; and, said horizontal beam having a horizontal attachment flange at said connecting location for attaching said apparatus to said rotatable flange.

7. The apparatus of claim 1, said receiving lever being pivotally connected to said long lever arm for pivotal movement between an upper position and a lower position, said apparatus comprising said actuating means for pivotally moving said receiving lever between said positions.

8. The apparatus of claim 7, said actuating means comprising extendable telescopic drive means interconnecting said long lever arm and said receiving lever.

9. The apparatus of claim 7, said actuating means comprising spindle drive means interconnecting said long lever arm and said receiving lever.

10. The apparatus of claim 9, said spindle drive means comprising:

a spindle unit including a first threaded spindle member pivotally connected at one end thereof to said receiving lever; and, a second threaded spindle member threadably engaging said first threaded spindle member;

pivot drive means mounted on said long lever arm; and, a cardan joint for connecting said second threaded spindle member to said pivot drive means.

11. The apparatus of claim 7, said actuating means comprising: a pivot shaft fixedly connected to said receiving lever for pivotally connecting said receiving lever to said long lever arm; a gear wheel fixedly connected to said pivot shaft; and, pivot drive means for engaging and rotating said gear wheel thereby pivotally moving said receiving lever through at least 180° between upper and lower positions.

12. The apparatus of claim 11, said long lever arm having an outer end portion defining a hollow cavity therein; said pivot drive means being mounted in said cavity.

13. The apparatus of claim 12, said pivot drive means comprising: a threaded spindle; and electro-mechanical drive disposed in said outer end portion for rotating said threaded spindle; a linear gear operatively connected to said threaded spindle; and, gear means for operatively connecting said linear gear to said gear wheel whereby a rotational movement of said threaded spindle is transmitted to said gear wheel for pivotally moving said receiving lever.

14. The apparatus of claim 12, said long lever arm having an end portion configured to have a larger cross-section than the remaining portion thereof.

15. The apparatus of claim 12, said long lever arm being a telescopically extendable arm having a plurality of telescopic segments, the outermost segment of said long lever arm having a crosssection greater than the next to last segment of said long lever arm.

* * * * *